United States Patent Office 2,806,842
Patented Sept. 17, 1957

2,806,842

ALKYLENE OXIDE GRAFT COPOLYMERS

John Fred Gerecht, Douglaston, N. Y., and Irving Joseph Krems, Fort Lee, and Philip Weiss, Nutley, N. J., assignors to Colgate-Palmolive Company, Jersey City, N. J., a corporation of Delaware No Drawing. Application October 24, 1955, Serial No. 542,507

11 Claims. (Cl. 260—78)

The present invention relates to novel graft copolymers and to a process for preparing the same.

Graft copolymers are a recent development in the field of polymeric chemistry. A survey of the literature indicates that the preparations of graft copolymers have been accomplished specifically by the polymerization of a monomer in the presence of a preformed polymer as indicated by J. Polymer Science, vol. 8, page 289 (1952) and vol. 9, page 61 (1952), or from a polymeric hydroperoxide as shown in J. Polymer Science, vol. 16, page 345 (1955). The preparation by the former method based upon chain transfer is limited in scope since the two homopolymers may be obtained in addition to the graft copolymer. A tedious fractionation in selected mixed solvents is required for the recovery of the desired graft copolymer. The preparation from an autoxidized polymer yields graft copolymers with few links because of the low yields obtained during formation of the hydroperoxide groups. It is apparent that there are many difficulties involved in the published methods for preparation of graft copolymers which place restrictions upon the type, structure and composition of the products which can be formed thereby.

In accordance with the present invention, a new type of graft copolymer containing a predetermined balance of hydrophilic and hydrophobic units to impart a desired degree of surface activity to the product has been discovered which comprises a polyalkoxamer amide of a hydrophobic copolymer derived from a vinyl compound and an unsaturated copolymerizable compound containing a carboxylic carbonyl group, to form thereby a polymeric hydrophilic chain containing amide and ether groups on said copolymer.

The novel products of the present invention may be prepared in any suitable manner. In general, the grafting of the hydrophilic chains to the initial copolymer may be accomplished by the reaction of the copolymer with an aminoalcohol to form an amidoalcohol, followed by the addition of an epoxide compound to the reactive hydroxyl group. More particularly, a method which has been found to be conducive to commercial operation and produces a product in good yield and purity comprises the reaction of an aminoalcohol having at least two carbons with a copolymer having a carboxylic ester group so as to preferentially form the corresponding amide having a reactive hydroxyl group, and condensing the resulting product with an epoxide compound such as an alkylene oxide.

The final products are essentially non-(cross-linked) in order to avoid rigidity to the molecule and provide a hydrophilic tail on a hydrophobic backbone. As a result, the adducts tend to be more soluble or dispersible in water or other polar solvents than the original copolymer and yet retain solubility in non-polar solvents. Such adducts have useful application in many fields of endeavor therefore.

The backbone copolymer should be selected so that it is essentially linear and hydrophobic with a sufficient number of potential points for grafting so as to permit desired variation in structure, composition and properties with varying proportions of the hydrophilic side-chains in the final product.

A type of copolymer which has been found to be particularly suitable as an initial reactant is a copolymer of an aromatic vinyl compound and an ester of an unsaturated carboxylic acid. Examples of the former material are styrene and substituted styrene compounds containing inert substituents such as alkyl styrenes, e. g. methyl and ethyl styrene; halogenated styrenes, e. g. p-chlorostyrene, 2,4 dichlorostyrene and m-bromostyrene; alkoxy styrenes, e. g. p-methoxystyrene; nitrogen-substituted styrenes, e. g. p-nitrostyrene and p-dimethylaminostyrene, and the like. Suitable examples of the ester monomers are the esters of unsaturated carboxylic acids having the conjugated grouping (—C=C—CO). It is preferred to use the esters derived from such acids and aliphatic alcohols, and particularly the lower alkyl esters of polycarboxylic acids, such as dimethyl maleate, diethyl maleate, diethyl fumarate, dimethyl itaconate, di-n-butyl itaconate, dimethyl citraconate, and the like. The corresponding esters derived from aromatic alcohols, cycloaliphatic alcohols or heterocyclic alcohols may be employed also. Examples of such esters are di-phenyl maleate, di-cyclohexyl maleate, di-2-hydroxythiophene maleate. Other suitable esters of carboxylic acids which may be employed are methyl crotonate, methyl isocrotonate, methyl acrylate, methyl methacrylate, etc.

Similar copolymers containing a carboxylic carbonyl group other than in the form of an ester may be employed also as the initial reactant to form the amide as described below. Such materials are the copolymers of the aromatic vinyl compounds specified above with the corresponding acid halide, e. g. acid chloride, the acid anhydrides or the free carboxylic acids in place of the ester. Suitable examples are the copolymers of styrene or methyl styrene with fumaryl chloride, maleic anhydride, itaconic anhydride, maleic acid, etc.

The initial copolymer is known in the art, such as the copolymer of styrene and dimethyl maleate illustrated in J. Am. Chem. Soc., vol. 70, p. 1533 (1948). The typical chain unit in poly(styrene co dimethyl maleate) may be illustrated by the following diagrammatic structural formula:

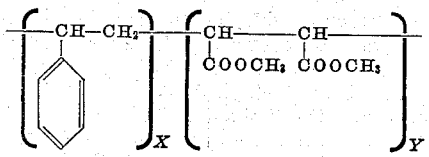

where X is the number of moles of styrene and Y is the number of moles of maleate compound which determines the composition of the copolymer. In known manner, products of varying composition and moleculer weight may be formed as desired, depending upon the concentrations of the monomers, their reactivities, initiator and other conditions of the reaction. For example, the above copolymer is formed from styrene and dimethyl maleate at 56° C. using a peroxide initiator such as benzoyl peroxide. Variations in copolymer composition provided the functional groups are not obscured may be effected by changing the initial molar concentrations of the monomers, and variations in molecular weight may be effected by changing the concentration of initiator.

It is preferred to employ copolymers wherein the molar ratio of the aromatic vinyl compound, e. g. styrene, to the carboxylic compound is from about 1:1 to about 4:1. The copolymers may have any suitable molecular weights but optimum effects are obtained with copolymers having a molecular weight up to about 100,000 and usually up to about 50,000.

The copolymer containing the functional carboxylic groups in the form of esters or any other reactive groups is reacted with an aminoalcohol to form an amide containing a free hydroxyl group, followed by condensation of an epoxide compound to form a side chain containing on the average at least two moles, viz. the alcoholamine and one or more moles of the epoxide compound. This novel type of graft copolymer may be illustrated by the following typical diagrammatic reaction of poly(styrene co dimethyl maleate) and monoethanolamine, and the subsequent addition of p moles of ethylene oxide:

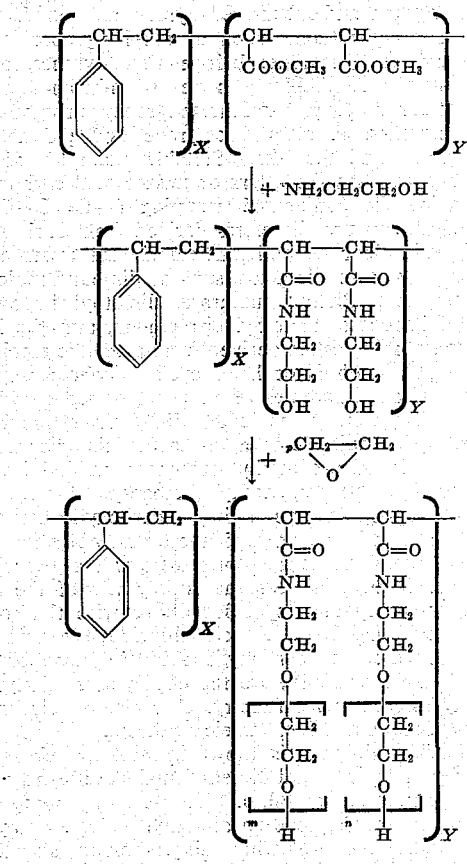

where $m+n=p$.

The first reaction with the ethanolamine represents an effective means of converting the ester linkages to an amidoalcohol product which has a high hydroxyl content and is obtainable in high yield and purity. For example, it has been found that about 90% of the available ester groups can be converted to the ethanolamides from a copolymer of styrene and dimethyl maleate having a molar composition of approximately 3:1 styrene to maleate.

Any aminoalcohol having a replaceable hydrogen atom attached to the nitrogen atom may be used in the amidation reaction. It is preferred to employ the lower alkylolamines, e. g. up to about four carbons in each alkylol group, such as monoethanolamine, diethanolamine, monopropanolamine, monoisopropanolamine, monoglycerylamine, tris(hydroxymethyl)aminomethane, N-methyl ethanolamine, and monobutanolamine. Examples of cycloaliphatic and aromatic aminoalcohols are aminocyclohexanol and p-aminophenol.

The reaction between the ester-containing copolymer and aminoalcohol may be effected under varying conditions. The reaction may be conducted by mixing suitable proportions, preferably under substantially anhydrous conditions. In general, substantially stoichiometric or equivalent ratios of aminoalcohol to ester groups may be employed as indicated by the foregoing typical equation. It is preferred to use an excess of the aminoalcohol to insure maximum conversion of the ester groups to amides. Accordingly, the amount of aminoalcohol per ester group is preferably from about 1:1 to about a 10:1 molar ratio in practice. Generally it is desirable to use elevated temperatures such as up to the refluxing temperature of the mixture in order to promote the amidation reaction and drive off the alcohol which is liberated from the ester group thereby. If desired, an amidation catalyst such as sodium, potassium, sodium hydroxide, etc., may be employed in small amounts in order to accelerate the amidation reaction.

The amidation reaction may be conducted in any suitable medium. An excess of the aminoalcohol, e. g. monoethanolamine, acts as a solvent medium or a suitable inert foreign solvent may be employed. When the ethanolamide reaction shown in the first reaction above was conducted by refluxing the copolymer with ethanolamine in the presence of diethylene glycol dimethyl ether as the solvent, the analysis of the product indicated the formation of imide groups in this reaction which may be subjected to subsequent reaction with epoxide compounds also. The term "amido" or its equivalent as used in the claims includes therefore the diamide or imide group.

The ethanolamide copolymer product or similar amidoalcohol copolymers are to be treated with an alkylene alpha, beta oxide to form the polyalkoxamer condensation products as indicated in the second reaction above. The term "polyalkoxamer" refers to the repeating alkylene oxide radical in the chain attached to the amide group, which may be substituted or unsubstituted. It is preferred to use the lower alkylene alpha, beta oxides such as ethylene oxide, propylene oxide, butylene oxide, etc. which, with the amidoalcohol, results in the formation of the polyalkoxamer chain. This chain may contain inert substitutents or radicals of an aliphatic, aromatic or heterocyclic structure. For example, such products may be prepared by the use of epoxides such as glycidyl acetate, glycidyl phenyl ether, and the like which yield polyalkoxamer chains containing aliphatic or aromatic substituents, etc.

Any desired amount of epoxide compound may be condensed to form the amide-ether sidechains. In addition to one molecular equivalent, the addition of increasing amounts will have the effect of changing in a desired manner the hydrophilic character of the sidechains and yielding final products containing linkages such as $-CON<(CH_2CH_2O)_n$ in the case of the reaction of the ethanolamide with ethylene oxide where $n$ is at least two. Suitable examples include the addition of one, two, six, ten, twenty-five, fifty and one hundred moles of alkylene oxide or similar epoxide compound per hydroxylamide group. In general, there should be added at least about 0.5 equivalents of epoxide compound per amide linkage in order to obtain optimum effects in surface activity and water-solubility or dispersibility.

The alkylene oxide or similar epoxide compound may be mixed or passed into the hydroxylamide copolymer at any suitable temperature and pressure. If desired elevated temperatures such as 100–250° C. and superatmospheric pressure may be employed depending upon the quantity and type of alkylene oxide in the system. The reaction is preferably conducted in a substantially anhydrous medium and in the presence of an inert organic solvent, such as dioxane, or hydrocarbons (e. g. benzene or xylene) or halogenated aromatic hydrocarbons, e. g. dichlorobenzene. In general, it is undesirable to employ reactive solvents such as ethyl alcohol or an aqueous medium since such systems will tend to form polyalkylene glycols or ethers, producing a heterogeneous mixture rather than the desired graft copolymer.

The final product may be concentrated or precipitated from the solvent, and, if desired, further purified in any particular manner such as by re-precipitation from suitable solvents. There are obtained solid materials which exhibit variable surface activity and solubilities, depending upon the type of initial co-polymer and hydrophilic ether-amide sidechains. It is characteristic of this invention that this relationship of hydrophobic to hydrophilic portions of the final product may be varied as desired, depending upon the intended use for a given product. It is readily possible to select the copolymer and the length and type of ether sidechains so that the product shows affinities toward both aqueous and fatty or oily matters, or in which the affinity for one type material exceeds the affinity for the other type. The products are further characterized by the fact that they are essentially non-ionic and therefore are compatible with many different types of materials. They may be heated to reasonably elevated temperatures without materially affecting the structure or properties of the products, such as would occur by cross-linking. Thus, the products may be used as emulsifying, wetting and thickening agents, or anti-static agents, etc., in detergent compositions and cosmetics such as shampoos and lotions, in tex-tile-treating compositions, in the manufacture of dispersions, gels, etc.

The following specific examples are further illustrative of the nature of the present invention, but it is to be understood that the invention is not limited thereto. The compositions are prepared in the usual manner and all amounts of the various ingredients are by weight unless otherwise specified.

EXAMPLE I

Styrene (0.5 mole) is copolymerized with dimethyl maleate (1.5 moles) in a sealed jar at 60° C. for 70 hours using 0.54 mole percent of benzoyl peroxide as the initiator. The poly(styrene co dimethyl maleate) is obtained as a white solid by precipitation from methanol. This copolymer (approx. mol. wt. 20,000) contains approximately 3 styrene units per 1 dimethyl maleate as determined by the methoxyl analysis.

Twenty-five grams of poly(styrene co dimethyl maleate) is reacted with 68 ml. of monoethanolamine at the boiling point using metallic sodium as the catalyst. The isolated product obtained by triturating in methyl ethyl ketone indicates an 85% conversion of ester to amide. The resulting poly(styrene co maleic ethanolamide) is dissolved in dioxane, sodium methoxide is added as a catalyst, and ethylene oxide is passed through the refluxing solution for 1½ hours. The isolated graft copolymer is dispersible in water and by nitrogen analysis indicates that approximately 10 ethylene oxide units per ethanolamide linkage are incorporated in the product.

EXAMPLE II

Poly(styrene co dimethyl maleate) is formed as in Example I using a styrene concentration of 0.25 mole, dimethyl maleate concentration of 0.75 mole and a benzoyl peroxide concentration of 0.27 mole percent, and a reaction time of 72 hours. The resulting product has a molecular weight of approximately 18,000, 13.60% methoxyl content and a composition of approximately 3 styrene units per dimethyl maleate.

60 grams of the above poly(styrene co dimethyl maleate) is added to 300 ml. of distilled monoethanolamine. Two grams of cut sodium is added in small portions to the stirred heterogeneous reaction mixture which is refluxed for 3 hours during which time a homogeneous solution is formed. The mixture is concentrated in vacuo to remove the excess monoethanolamine and the residue is triturated with methyl ethyl ketone to remove any unreacted poly(styrene co dimethyl maleate). The resulting pale yellow solid is washed with diethyl ether, filtered and dried to a yield of 46 grams (analysis: %OCH₃=1.23; %N=4.05). On the basis of methoxyl and nitrogen analyses, 88% of the available esters are converted to ethanolamides, resulting in poly(styrene co maleic ethanolamide).

65 grams of the above poly(styrene co maleic ethanolamide) is dissolved in one liter of dioxane and 2 grams of sodium methoxide is added as a catalyst. At reflux temperature, ethylene oxide is bubbled through the solution for 5 hours. The reaction mixture is concentrated under vacuo to a gummy residue. The residue is dissolved in 300 ml. of methanol which is slowly added into 3 liters of acetone with stirring. A white solid forms which is filtered, washed with diethyl ether and dried to a yield of 37 grams. On the basis of nitrogen analysis (N=3.71%), 1.6 ethylene oxide units per ethanolamide are grafted to the copolymer.

Further pertinent data relative to this adduct and other ethylene oxide additions to poly(styrene co maleic ethanolamide) of varying molecular weights prepared by the above general procedure are listed in the following table:

Table.—*Ethylene oxide adducts of poly(styrene co maleic ethanolamide)*

| Mol. wt.[1] | Moles ethylene oxide per ethanolamide | Solubility |
| --- | --- | --- |
| 10,000 | 2.2 | Oil soluble. |
| 10,000 | 4.6 | Water dispersible. |
| 18,000 | 0.8 | Oil soluble. |
| 18,000 | 1.6 | Water dispersible. |
| 18,000 | 4.2 | Do. |
| 42,000 | 6.8 | Oil soluble. |

[1] Molecular weight of initial poly(styrene co dimethyl maleate), composition: 3 styrene units per maleate.

While various specific examples of preferred compositions and methods embodying the present invention have been described above, it will be apparent that many changes and modifications may be made in the methods of procedure and that a wide variety of specific reagents may be employed in carrying out the procedure. It should therefore be understood that the examples cited and the particular proportions, methods of procedure, and compounds set forth above are intended to be illustrative only and are not intended to limit the scope of the invention.

Having thus described the invention, what is claimed is:

1. An alkylene alpha, beta oxide addition product of a copolymer of (a) a styrene compound selected from the group consisting of styrene and styrene bearing inert substituents and (b) an alpha, beta ethylenically unsaturated aliphatic carboxylic acid amidoalcohol, said addition product being substantially free of ionic groups.

2. An addition product in accordance with claim 1 wherein said alkylene oxide is ethylene oxide.

3. An alkylene alpha, beta oxide addition product of a copolymer of (a) a styrene compound selected from the group consisting of styrene and styrene bearing inert substituents and (b) an alpha, beta ethylenically unsaturated aliphatic carboxylic acid hydroxyalkylamide, said addition product being substantially free of ionic groups.

4. An addition product in accordance with claim 3 wherein said copolymer has a molar ratio of said styrene compound to said carboxylic acid compound of about 1:1 to about 4:1.

5. An ethylene oxide addition product of a copolymer of styrene and an alpha, beta ethylenically unsaturated aliphatic polycarboxylic acid hydroxyalkylamide, said addition product being substantially free of ionic groups.

6. An alkylene alpha, beta oxide addition product of a copolymer of styrene and maleic acid hydroxyalkylamide, said addition product being substantially free of ionic groups.

7. An ethylene oxide addition product of a copolymer of styrene, maleic acid methyl ester and monoethanolamide of maleic acid.

8. An ethylene oxide addition product in accordance with claim 7 wherein said copolymer has a molar ratio of styrene to maleic acid groups of about 1:1 to about 4:1.

9. An ethylene oxide addition product of a copolymer of styrene, maleic acid methyl ester and monoethanolamide of maleic acid, said copolymer having a molar ratio of styrene to maleic acid groups of about 3:1.

10. A process which comprises heating monoethanolamine with a copolymer of styrene and dimethyl maleate, said copolymer having a molar ratio of styrene to maleic acid groups of about 1:1 to about 4:1, and forming as a reaction product a copolymer of styrene, maleic acid methyl ester and monoethanolamide of maleic acid, mixing said latter copolymer with an inert organic solvent and adding ethylene oxide to said mixture at a temperature from about 100 to 250° C. in a substantially anhydrous medium to form an ethylene oxide addition product of said copolymer of styrene, maleic acid methyl ester and monoethanol-amide of maleic acid.

11. A process which comprises heating a copolymer of styrene and maleic acid hydroxyalkyl-amide with an alkylene alpha, beta oxide in the presence of an inert organic solvent at a temperature from about 100 to 250° C. in a substantially anhydrous medium and forming an addition product of said alkylene oxide and said copolymer.

References Cited in the file of this patent

J. Polymer Science, vol. VIII, No. 3, pp. 257–277, 1952. (Copy in Division 60.)